(12) United States Patent
Tsai et al.

(10) Patent No.: US 11,347,067 B2
(45) Date of Patent: May 31, 2022

(54) DISPLAY SYSTEM

(71) Applicants: Chih-Hsien Tsai, Hsinchu (TW); Chao-Shun Chen, Hsinchu (TW)

(72) Inventors: Chih-Hsien Tsai, Hsinchu (TW); Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 14/568,119

(22) Filed: Dec. 12, 2014

(65) Prior Publication Data

US 2016/0170216 A1 Jun. 16, 2016

(51) Int. Cl.
G02B 27/01 (2006.01)

(52) U.S. Cl.
CPC ..... G02B 27/0179 (2013.01); G02B 27/0101 (2013.01); G02B 2027/0183 (2013.01); G02B 2027/0185 (2013.01)

(58) Field of Classification Search
CPC ................ G02B 27/01; G02B 27/0101; G02B 27/0172; G06T 19/006
USPC ...................................... 345/7, 633; 359/630
See application file for complete search history.

(56) References Cited

U.S. PATENT DOCUMENTS

| | | | | |
|---|---|---|---|---|
| 3,697,154 A | * | 10/1972 | Johnson | G02B 27/0101 348/832 |
| 5,812,332 A | * | 9/1998 | Freeman | B32B 3/02 156/102 |
| 7,671,822 B2 | | 3/2010 | Dobschal | |
| 7,688,516 B2 | | 3/2010 | Choi et al. | |
| 7,832,869 B2 | | 11/2010 | Maximus et al. | |
| 7,936,518 B2 | | 5/2011 | Takahashi et al. | |
| 8,451,541 B2 | | 5/2013 | Labrot et al. | |
| 2007/0008241 A1 | * | 1/2007 | Dobschal | G02B 27/0101 345/7 |
| 2010/0067118 A1 | * | 3/2010 | Takahashi | G02B 27/01 359/633 |
| 2013/0021224 A1 | * | 1/2013 | Fujikawa | G02B 27/0101 345/7 |
| 2013/0073115 A1 | * | 3/2013 | Levin | A61B 5/18 701/1 |
| 2013/0188259 A1 | * | 7/2013 | Nakamura | G02B 27/0101 359/630 |
| 2013/0265646 A1 | * | 10/2013 | Sakai | G02B 27/01 359/631 |
| 2014/0320952 A1 | * | 10/2014 | Chen | G02B 27/0101 359/303 |

\* cited by examiner

*Primary Examiner* — Yi Yang
(74) *Attorney, Agent, or Firm* — JCIPRNET

(57) ABSTRACT

A display system including a display device and a light combining device is provided. The display device includes a first display region and a second display region. The light combining device has a first surface and a second surface opposite to the first surface. At least one part of a first light beam from the first display region is reflected by the first surface to an observing region so as to form a first virtual image. At least one part of a second light beam from the second display region penetrates through the first surface, is reflected by the second surface, penetrates through the first surface again, and is transmitted to the observing region in sequence, so as to form a second virtual image.

16 Claims, 4 Drawing Sheets

DISPLAY SYSTEM

BACKGROUND OF THE INVENTION

1. Field of the Invention

The invention generally relates to an optical system and, in particular, to a display system.

2. Description of Related Art

In modern society, requirements for vehicles include not only those for the vehicles' performance, and attention has also begun to be paid to the vehicles' interior and safety equipment. With the help of technology products nowadays (e.g., in-car voice navigation system, voice-based collision warning system, etc.), the incidence of accidents caused by drivers in states such as long-time drowsy driving, distracted and so on has indeed dropped. In the meantime, however, since a non-voice information display apparatus is generally mounted on a dashboard, when the driver lowers their head to watch the apparatus, driving safety is likely to be affected.

As a result, a display device that can less reduce the attention of the driver, can reduce the fatigue of the driver, and can increase the driving safety is required to be developed.

SUMMARY OF THE INVENTION

Accordingly, the invention is directed to a display system which can enable a driver to more quickly focus his or her eyes on the virtual image formed by the display system and to reduce the fatigue of the driver.

According to an embodiment of the invention, a display system including a display device and a light combining device is provided. The display device includes a first display region and a second display region. The light combining device has a first surface and a second surface opposite to the first surface. At least one part of a first light beam from the first display region is reflected by the first surface to an observing region so as to form a first virtual image. At least one part of a second light beam from the second display region penetrates through the first surface, is reflected by the second surface, penetrates through the first surface again, and is transmitted to the observing region in sequence, so as to form a second virtual image.

According to an embodiment of the invention, a display system including a display device and a light combining device is provided. The display device includes a first display region and a second display region. The light combining device is configured to deflect at least one part of a first light beam from the first display region to an observing region so as to form a first virtual image, and configured to deflect at least one part of a second light beam from the second display region to the observing region so as to form a second virtual image.

In the display system according to the embodiment of the invention, since the first virtual image and the second virtual image are formed, a drive can focus his or her eyes on one of the first virtual image and the second virtual image at an appropriate distance. As a result, a driver can more quickly focus his or her eyes on the virtual image. Therefore, the response time of the driver is shortened, and the fatigue of the driver is reduced, so that the driving safety is increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
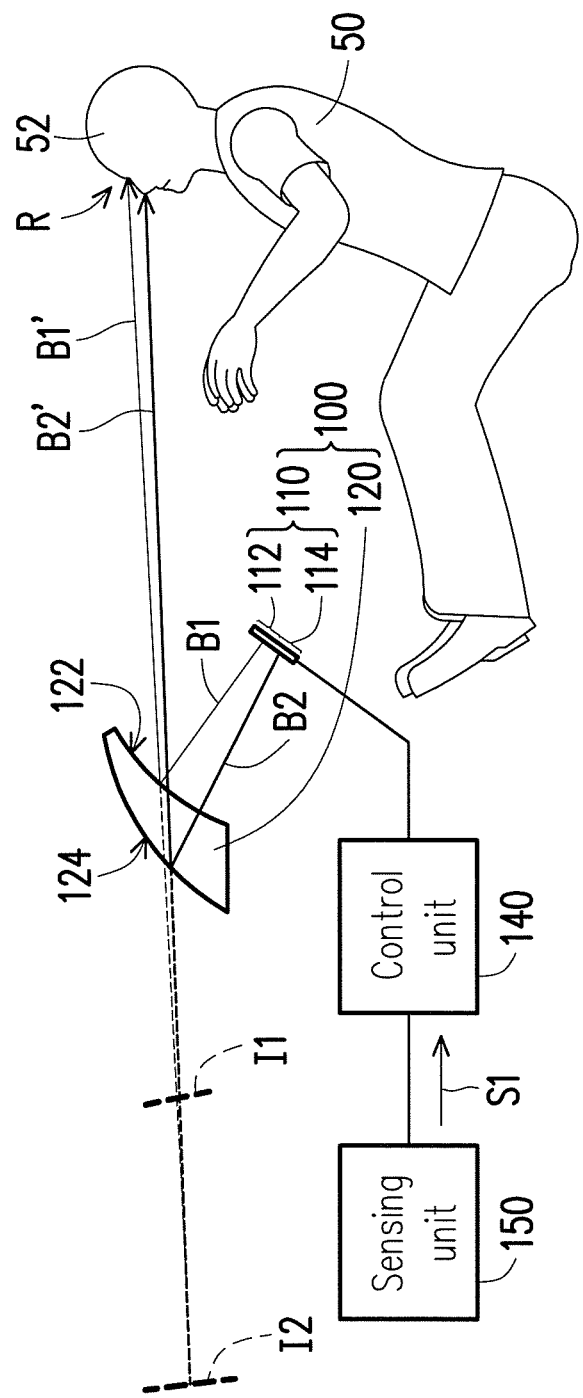
FIG. 1 is a schematic view of a display system according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

A head-up display (HUD) displays the information desired by the driver in front of the driver, so that the driver does not have to lower or turn his or her head distractedly, which thus enhances driving safety. Nonetheless, while driving a car, the driver focuses his or her eye at different distances at different car speeds. In general, in high-speed driving (e.g., driving on a highway), the driver focuses his or her eye at a further distance in front of the car; in low-speed driving (e.g., driving in an urban area), the driver has his or her eye on road conditions within a shorter distance in front of the car. However, if an image distance between an image generated by the head-up display and the driver's eye is single and fixed, and if the driver intends to view the information shown by the head-up display, whether in high-speed or low-speed driving, the driver has to spend time focusing his or her eye at the image distance at which the image is located. Such time for focusing the eye delays the time that the driver notices the road conditions in front of the car, and the fatigue of the driver is also increased.

Figure 2:
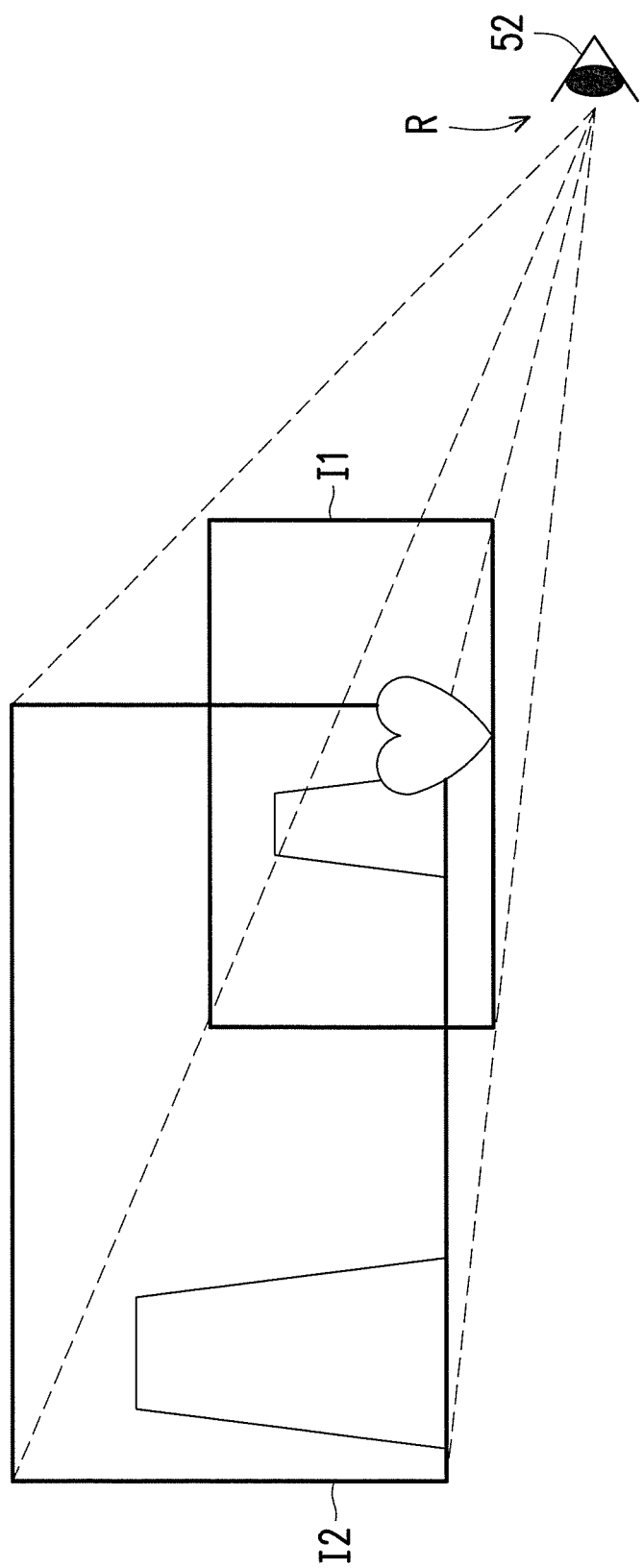
FIG. 2 shows the first virtual image and the second virtual image in FIG. 1.
Figure 3:
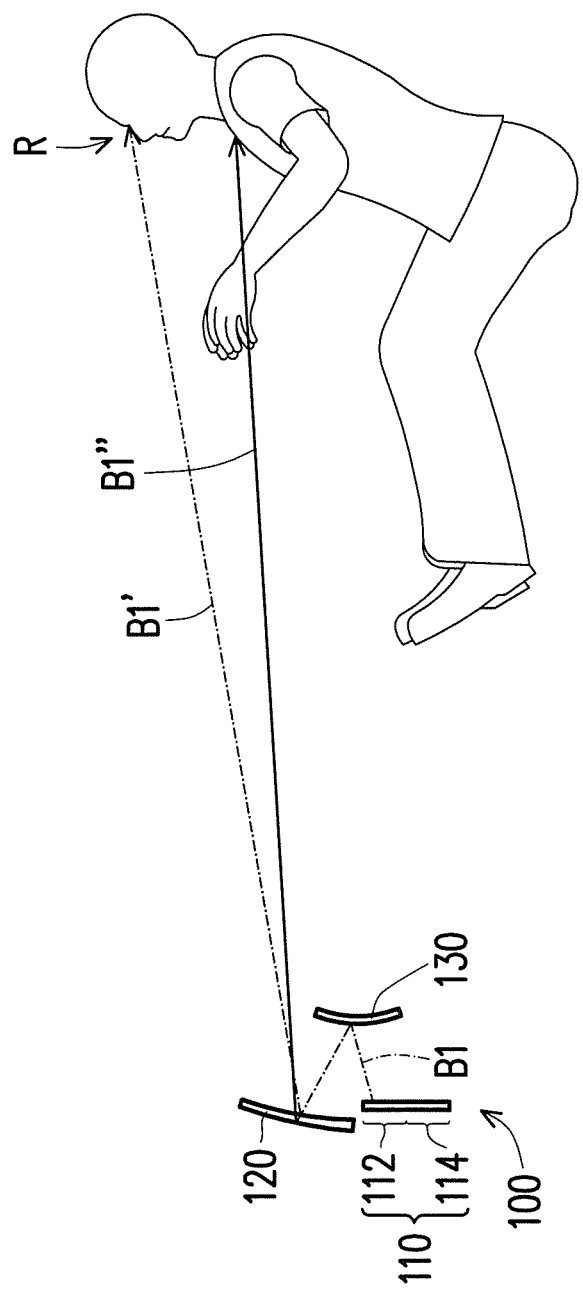
FIG. 3 shows another part of the first light beam not transmitted to the observing region in FIG. 1.
Figure 4:
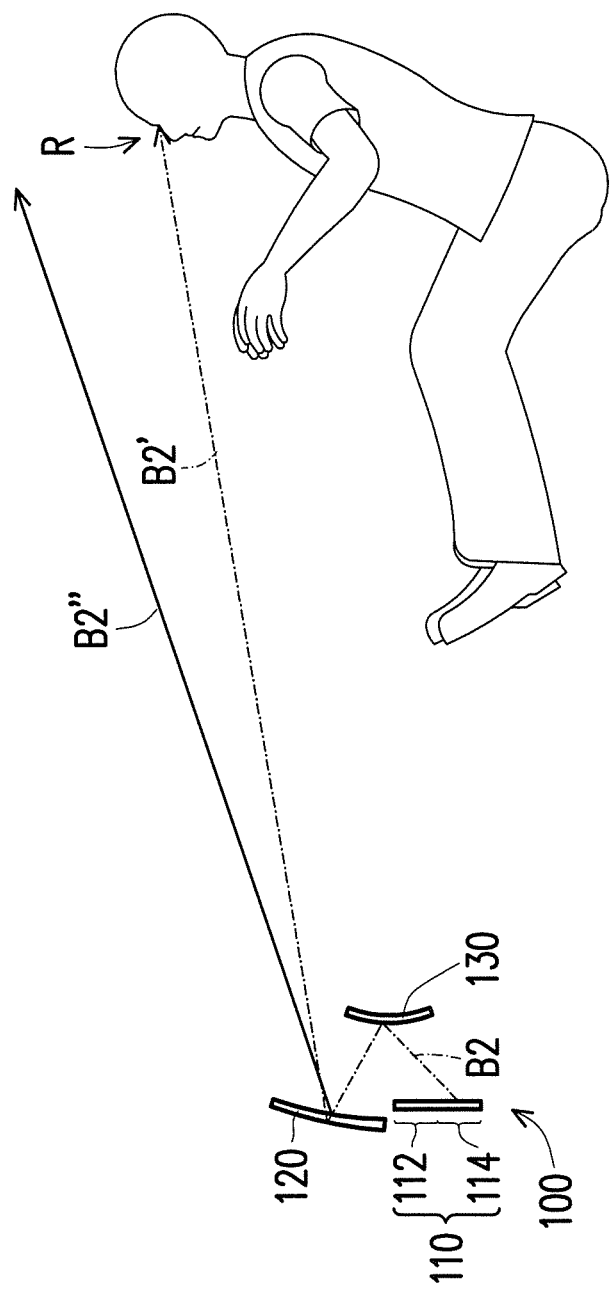
FIG. 4 shows another part of the second light beam not transmitted to the observing region in FIG. 1.

FIG. 1 is a schematic view of a display system according to an embodiment of the invention, FIG. 2 shows the first virtual image and the second virtual image in FIG. 1, FIG. 3 shows another part of the first light beam not transmitted to the observing region in FIG. 1, and FIG. 4 shows another part of the second light beam not transmitted to the observing region in FIG. 1. Referring to FIGS. 1-4, a display system 100 in this embodiment may be a head-up display disposed inside the windshield of a vehicle. The display system 100 in this embodiment includes a display device 110 and a light combining device 120. The display device 110 includes a first display region 112 and a second display region 114. The light combining device 120 is configured to deflect at least one part of a first light beam B1 (e.g., a first part B1' of the first light beam B1) from the first display region 112 to an observing region R so as to form a first virtual image I1, and configured to deflect at least one part of a second light beam B2 (e.g., a first part B2' of the second light beam B2) from the second display region 114 to the observing region R so as to form a second virtual image I2.

Specifically, the light combining device 120 has a first surface 122 and a second surface 124 opposite to the first surface 122. At least one part of the first light beam B1 (e.g., the first part B1' of the first light beam B1) from the first display region 112 (e.g., an upper display region) is reflected by the first surface 122 to the observing region R, where at least one eye of a driver is located, so as to form the first virtual image I1. At least one part of the second light beam B2 (e.g., the first part B2' of the second light beam B2) from the second display region 114 penetrates through the first surface 122, is reflected by the second surface 124, penetrates through the first surface 122 again, and is transmitted to the observing region R in sequence, so as to form the second virtual image I2. Each of the first virtual image I1 and the second virtual image I2 may contain the information desired by the driver.

In this embodiment, the display device 110 may be a liquid crystal display, an organic light-emitting device display, a light-emitting device display, or any other appropriate display. The light combining device may be made of a transparent material, so that light from an object in front of the vehicle can penetrate through the light combining device and be transmitted to the eyes of the driver. The first surface 122 and the second surface 124 are curved surfaces. In this embodiment, the first surface 122 and the second surface 124 are freeform surfaces or aspheric surfaces. Moreover, in this embodiment, the first surface 122 is a concave surface, and the second surface 124 is a convex surface. As a result, each of the first surface 122 and the second surface 124 may serve as a concave mirror, and each of the first virtual image I1 and the second virtual image I2 is thus an enlarged virtual image. In this embodiment, the slope variation of the first surface 122 is different from that of the second surface 124.

In the display system 100 in this embodiment, since the first virtual image I1 and the second virtual image I2 are formed, a drive can focus his or her eyes on one of the first virtual image I1 and the second virtual image I2 at an appropriate distance. As a result, a driver can more quickly focus his or her eyes on one of the first virtual image I1 and the second virtual image I2. Therefore, the response time of the driver is shortened, and the fatigue of the driver is reduced, so that the driving safety is increased.

In this embodiment, the first surface 122 is between the second surface 124 and the observing region R, the second surface 124 is disposed between the first virtual image I1 and the first surface 122, and the second surface 124 is disposed between the second virtual image I2 and the first surface 122. Moreover, the first virtual image I1 is between the second virtual image I2 and the light combining device 120, and the first virtual image I1 is between the second virtual image I2 and the second surface 124.

In this embodiment, the display system 100 further includes a control unit 140 configured to switch the display device 110 to a first state (as shown in FIG. 3) and a second state (as shown in FIG. 4). In this embodiment, the display device 110 is electrically connected to the control unit 140. When the display device 110 is switched to the first state (as shown in FIG. 3), the first display region 112 emits the first light beam B1 and the second display region 114 does not emit the second light beam B2. Consequently, the first virtual image I1 is formed, and the second virtual image I2 is not formed. When the display device 110 is switched to the second state (as shown in FIG. 4), the second display region 114 emits the second light beam B2 and the first display region 112 does not emit the first light beam B1. Consequently, the second virtual image I2 is formed, and the first virtual image I1 is not formed. Therefore, in high-speed driving, the control unit 140 may switch the display device 110 to the second state to form the second virtual image I2 which has a larger distant from the observing region R, so that the driver can focus his or her eye quickly on the second virtual image I2. Moreover, in low-speed driving, the control unit 140 may switch the display device 110 to the first state to form the first virtual image I1 which has a shorter distant from the observing region R, so that the driver can focus his or her eye quickly on the first virtual image I1.

In this embodiment, the control unit 140 is configured to receive an external signal S1 and determine to switch the display device 110 to the first state or the second state according to the external signal S1. The external signal S1 may include a signal from a radar, a signal from a camera configured to detect at least one eye of a user, a signal from a camera configured to detect a front car, or a combination thereof. Specifically, a sensing unit 150 may be electrically connected to the control unit 140 to help the control unit 140 determine that the vehicle is at a high speed or a low speed. The sensing unit 150 may be a radar configured to detect a front car, a camera configured to detect the interval between the eyes so as to determine the distance the eyes focus on, a camera (e.g., an infrared camera) configured to detect a front car or a combination thereof.

Referring to FIGS. 3 and 4, the display system 100 may further include an optical element 130 disposed on paths of the first light beam B1 and the second light beam B2 between the display device 110 and the light combining device 120. The optical element 130 may include a curved mirror, a lens, a plane mirror, or a combination thereof. In FIGS. 3 and 4, a curved mirror is exemplarily shown. For simplicity, FIG. 1 does not show the optical element 130 of the display device 110. However, in some other embodiment, the display device 110 may not include the optical element 130.

In this embodiment, as shown in FIG. 3, the first part B1' of the first light beam B1 from the first display region 112 is deflected by the light combining device 120 to the observing region R so as to form the first virtual image I1, while a second part B1" of the first light beam B1 is deflected by the light combining device 120 toward a direction deviating from the observing region R. Specifically, in this embodiment, the first part B1' of the first light beam B1 from the first display region 112 is reflected by the first surface 122 to the observing region R, while the second part B1" of the first light beam B1 penetrates the first surface 112, is reflected by the second surface 124, penetrates through the first surface 112 again, and is transmitted toward a direction deviating from the observing region R in sequence, e.g., transmitted to a region below the observing region R. As a result, the first virtual image I1 may not be interfered with by the second part B1" of the first light beam B1.

On the other hand, as shown in FIG. 4, the first part B2' of the second beam B2 from the second display region 114 is deflected by the light combining device 120 to the observing region R so as to form the second virtual image I2, while a second part B2" of the second beam B2 from the second display region 124 is deflected by the first combining device 120 toward a direction deviating from the observing region R. Specifically, in this embodiment, the first part B2' of the second beam B2 from the second display region 114 penetrates through the first surface 122, is reflected by the second surface 124, penetrates through the first surface 122 again, and is transmitted to the observing region R in sequence, while the second part B2" of the second beam B2 from the second display region 124 is reflected by the first surface 122 toward a direction deviating from the observing region R, e.g., transmitted to a region above the observing region R. As a result, the second virtual image I2 may not be interfered with by the second part B2" of the second light beam B2. For simplicity, the second part B1" of the first light beam B1 and the second part B2" of the second light beam B2 are not shown in FIG. 1, but are shown in FIGS. 3 and 4, respectively.

In the display system according to the embodiment of the invention, since the first virtual image and the second virtual image are formed, a drive can focus his or her eyes on one of the first virtual image and the second virtual image at an appropriate distance. As a result, a driver can more quickly focus his or her eyes on the virtual image. Therefore, the response time of the driver is shortened, and the fatigue of the driver is reduced, so that the driving safety is increased.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. A display system comprising:
   a display device comprising a first display region and a second display region; and
   a combiner having a first surface and a second surface opposite to the first surface, each of the first surface and the second surface being an aspheric surface or a free-form surface respectively, wherein at least one part of a first light beam from the first display region is reflected by the first surface to an observing region so as to form a first virtual image, and at least one part of a second light beam from the second display region penetrates through the first surface, is reflected by the second surface, penetrates through the first surface again, and is transmitted to the observing region in sequence, so as to form a second virtual image,
   wherein the combiner is not a windshield,
   wherein the distance between the first virtual image and the observing region is substantially different to the distance between the second virtual image and the observing region, and the distance between the first virtual image and the observing region is substantially smaller than the distance between the second virtual image and the observing region.

2. The display system according to claim 1, wherein the first virtual image is formed between the second virtual image and the combiner.

3. The display system according to claim 1, wherein the first surface is between the second surface and the observing region, the second surface is disposed between the first virtual image and the first surface, the second surface is disposed between the second virtual image and the first surface.

4. The display system according to claim 1, wherein a first part of the first light beam from the first display region is reflected by the first surface to the observing region, and a second part of the first light beam penetrates the first surface, is reflected by the second surface, penetrates through the first surface again, and is transmitted toward a direction deviating from the observing region in sequence.

5. The display system according to claim 4, wherein a first part of the second beam from the second display region penetrates through the first surface, is reflected by the second surface, penetrates through the first surface again, and is transmitted to the observing region in sequence, and a second part of the second beam from the second display region is reflected by the first surface toward a direction deviating from the observing region.

6. The display system according to claim 1, further comprising a control circuit configured to switch the display device to a first state and a second state, wherein when the display device is switched to the first state, the first display region emits the first light beam and the second display region does not emit the second light beam, and wherein when the display device is switched to the second state, the second display region emits the second light beam and the first display region does not emit the first light beam.

7. The display system according to claim 6, wherein the control circuit is configured to receive an external signal and determine to switch the display device to the first state or the second state according to the external signal.

8. The display system according to claim 7, wherein the external signal comprises a signal from a radar, a signal from a camera configured to detect at least one eye of a user, a signal from a camera configured to detect a front car, or a combination thereof.

9. The display system according to claim 1, further comprising an optical element disposed on paths of the first light beam and the second light beam between the display device and the combiner.

10. The display system according to claim 1, wherein the first surface is a concave surface, and the second surface is a convex surface.

11. The display system according to claim 1, wherein the combiner is made of a transparent material.

12. The display system according to claim 1, wherein a first part of the first light beam from the first display region is deflected by the combiner to the observing region so as to form the first virtual image, a second part of the first light beam is deflected by the combiner toward a direction deviating from the observing region, a first part of the second beam from the second display region is deflected by the combiner to the observing region so as to form the second virtual image, and a second part of the second beam from the second display region is deflected by the combiner toward a direction deviating from the observing region.

13. The display system according to claim 2 further comprising a control circuit configured to switch the display device to a first state and a second state, wherein when the display device is switched to the first state, the first display region emits the first light beam and the second display region does not emit the second light beam, and wherein when the display device is switched to the second state, the second display region emits the second light beam and the first display region does not emit the first light beam.

14. The display system according to claim 13, wherein the control circuit is configured to receive an external signal and determine to switch the display device to the first state or the second state according to the external signal.

15. The display system according to claim 14, wherein the external signal comprises a signal from a radar, a signal from a camera configured to detect at least one eye of a user, a signal from a camera configured to detect a front car, or a combination thereof.

16. A display system comprising:
    a display device comprising a first display region and a second display region; and
    a combiner having a first surface and a second surface opposite to the first surface, each of the first surface and the second surface being an aspheric surface or a free-form surface respectively, wherein at least one part of a first light beam from the first display region is reflected by the first surface to an observing region so as to form a first virtual image, and at least one part of a second light beam from the second display region penetrates through the first surface, is reflected by the second surface, penetrates through the first surface again, and is transmitted to the observing region in sequence, so as to form a second virtual image, wherein the combiner is one piece formed and not a windshield, and the distance between the first virtual image and the observing region is substantially smaller than the distance between the second virtual image and the observing region.

* * * * *